United States Patent
Reddy et al.

(10) Patent No.: US 9,218,428 B2
(45) Date of Patent: Dec. 22, 2015

(54) TECHNIQUES FOR GENERATING DIFFERENT SESSIONS FOR MULTIPLE TABS OF A SINGLE BROWSER WINDOW

(71) Applicant: Dell Products L.P., Round Rock, TX (US)

(72) Inventors: Jyotheeswara Reddy, Bangalore (IN); Prasoon Kumar Sinha, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 603 days.

(21) Appl. No.: 13/651,747

(22) Filed: Oct. 15, 2012

(65) Prior Publication Data

US 2014/0108667 A1    Apr. 17, 2014

(51) Int. Cl.
 G06F 15/16    (2006.01)
 G06F 17/30    (2006.01)

(52) U.S. Cl.
 CPC ................................ *G06F 17/30873* (2013.01)

(58) Field of Classification Search
 CPC ................................................ G06F 17/30873
 See application file for complete search history.

(56) References Cited

U.S. PATENT DOCUMENTS

| | | | |
|---|---|---|---|
| 6,098,093 A * | 8/2000 | Bayeh et al. | 709/203 |
| 7,296,076 B1 * | 11/2007 | Portolani | 709/227 |
| 7,991,830 B2 | 8/2011 | Li | |
| 8,245,151 B2 | 8/2012 | Selig | |
| 8,799,807 B2 * | 8/2014 | Molander et al. | 715/777 |
| 2004/0085366 A1 | 5/2004 | Foster et al. | |
| 2004/0093327 A1 * | 5/2004 | Anderson et al. | 707/3 |
| 2004/0133563 A1 * | 7/2004 | Harvey et al. | 707/3 |
| 2007/0244578 A1 * | 10/2007 | Stirbu | 700/65 |
| 2012/0174196 A1 * | 7/2012 | Bhogavilli et al. | 726/5 |
| 2012/0179743 A1 | 7/2012 | Sullivan et al. | |
| 2012/0209954 A1 | 8/2012 | Wright | |

OTHER PUBLICATIONS

Tredoux (Tredoux, Gavan, A method for allowing multiple user sessions from a web browser to a web server application, Xerox Disclosure Journal vol. 25 No. 1, Feb. 29, 2000).*

* cited by examiner

*Primary Examiner* — Brian J Gillis
*Assistant Examiner* — Michael A Keller
(74) *Attorney, Agent, or Firm* — Isidore Pllc

(57) ABSTRACT

A technique for creating different sessions for each tab of a client browser window includes receiving a first login request associated with a first tab of the client browser window, and in response to the first login request: generating a first uniform resource locator and a first session cookie having a path that includes the first uniform resource locator; and transmitting the first session cookie to the client browser. The technique further includes receiving a second login request that is associated with a second tab of the client browser window, and in response to the second login request, generating a second uniform resource locator and a second session cookie. The second uniform resource locator is different from the first uniform resource locator and a path of the second session cookie includes the second uniform source locator. The technique also includes transmitting the second session cookie to the client browser.

15 Claims, 7 Drawing Sheets

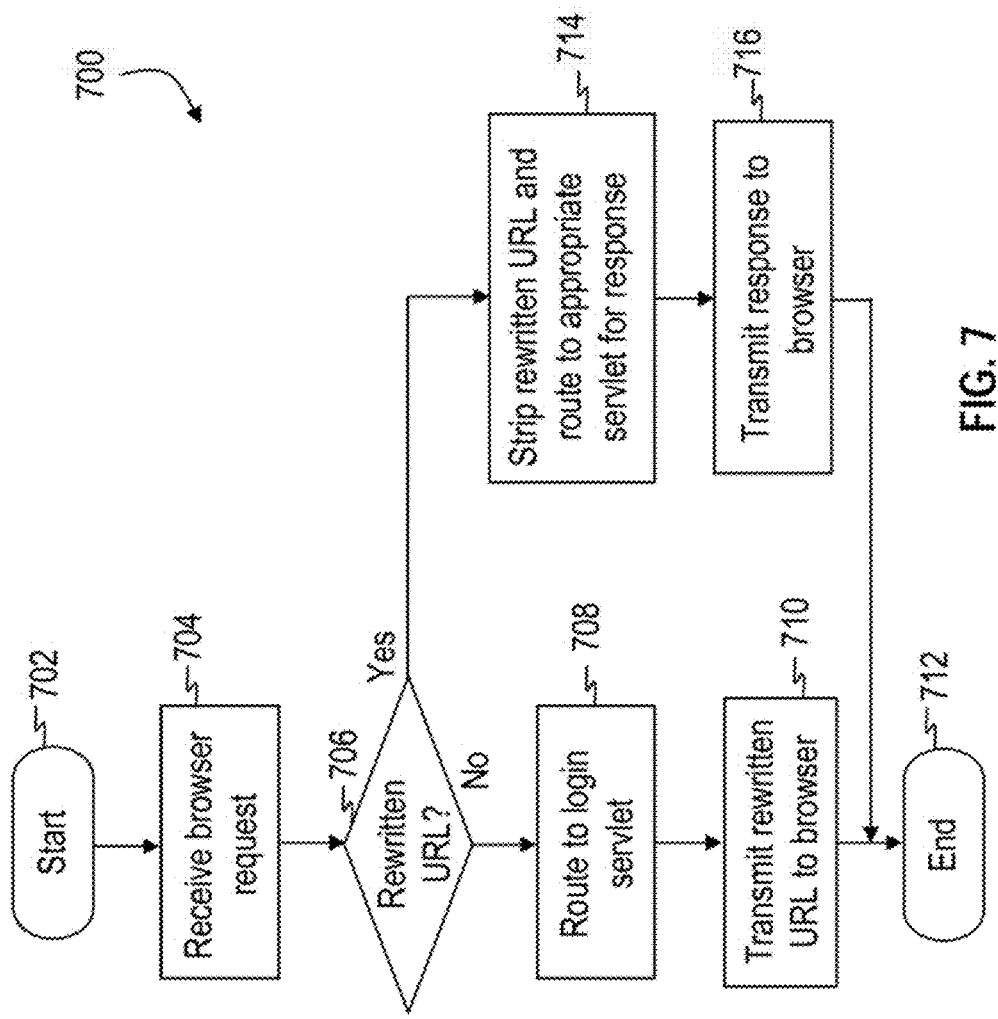

TECHNIQUES FOR GENERATING DIFFERENT SESSIONS FOR MULTIPLE TABS OF A SINGLE BROWSER WINDOW

BACKGROUND

1. Technical Field

The present disclosure generally relates to sessions for multiple tabs in a single browser window and, in particular, to techniques for generating different sessions for multiple tabs of a single browser window.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A servlet is a Java™ application that executes on a web server or application server to provide server-side processing. Servlets are designed to handle hypertext transfer protocol (HTTP) requests (e.g., get, post, etc.) and are the standard Java™ replacement for a variety of other approaches (e.g., common gateway interface (CGI) scripts, active server pages (ASPs), and proprietary C/C++ plug-ins). Java™ servlets are portable between servers and operating systems (OSs).

As is known, the term 'web server' can either refer to hardware (i.e., a server computer system), software (i.e., a web application), or a combination of hardware and software that facilitates delivery of web content via the Internet. The most common use of web servers is to host websites. The primary function of a web server is to deliver web pages (in the form of, for example, hypertext markup language (HTML) documents and additional related content, e.g., images, style sheets, and scripts) in response to requests from client computer systems (clients). A user agent (e.g., a web browser) of a client initiates communication with a web server by making an HTTP request for a specific resource. The web server responds to the HTTP request with content of the resource or an error message, if unable to provide the resource content. While the primary function of a web server is to serve content, a full implementation of HTTP is also configured to receive content (e.g., submitted web forms and uploaded files) from clients.

A cookie includes information that is sent from a website and stored by a web browser (browser) of a client, while a user of the client is browsing the website. When the user browses the same website in the future, the information stored in the cookie can be retrieved from the client by the website to notify the website of the user's previous activity. Cookies are designed to be a reliable mechanism for websites to remember the state of the website or previous activity of a user. For example, the information included in a cookie may specify particular buttons clicked, login information, or a record of which pages were visited by a user. In general, a session cookie for a website exists only while a user is reading and navigating the website. When an expiration date or validity interval is not set at cookie creation time, a session cookie is usually created. Web browsers normally delete session cookies when a user exits an associated client browser. In contrast, a persistent cookie (or tracking cookie) outlasts a user session and will be sent to a web server every time a user visits an associated website.

Uniform resource locator (URL) rewriting is an approach that is employed to modify an appearance of a URL. URL rewriting is typically used to generate cleaner and more descriptive URLs, while hiding the inner workings of a website. URL rewriting may also be used to provide an ability to change an underlying implementation of a website, since a rewritten URL typically gets rid of query strings and can be regenerated.

BRIEF SUMMARY

Disclosed are a method, an information handling system, and a computer program product for creating different sessions for each tab of a client browser window.

According to one aspect of the present disclosure, a method for creating different sessions for each tab of a client browser window includes receiving, by an information handling system, a first login request from a client browser. The first login request is associated with a first tab of a client browser window. The method includes, in response to the first login request: generating a first uniform resource locator (URL) and a first session cookie, and transmitting the first session cookie to the client browser. A path of the first session cookie includes the first uniform resource locator. The method further includes receiving, by the information handling system, a second login request from the client browser, where the second login request is associated with a second tab of the client browser window. The method also includes, in response to the second login request: generating a second uniform resource locator (URL) and a second session cookie, where the second URL is different from the first URL, and a path of the second session cookie includes the second URL. The method further includes transmitting the second session cookie to the client browser.

According to one aspect of the method, the generating of the first URL and the generating of the second URL comprises: a login servlet of the information handling system rewriting a general URL to respectively generate the first URL and the second URL as rewritten URLs, each having a respective unique session ID that is included within the session cookie transmitted to the client browser. A different session cookie is generated for each tab of a same browser window, and each session cookie provides the unique session ID, corresponding to the rewritten URL, that can be utilized by the client browser when generating subsequent requests from a corresponding tab of the client browser window to the information handling system.

According to yet another aspect of the method, the client browser is configured to transmit a first identifier that is associated with the first uniform resource locator to the information handling system for subsequent resource requests associated with the first tab and to transmit a second identifier that is associated with the second uniform resource locator to the information handling system for subsequent resource requests associated with the second tab. And, the method further includes, in response to receiving a subsequent request associated with one of the first tab and the second tab of the client browser: filtering the subsequent request by stripping out the unique ID from the rewritten URL contained in the subsequent request to provide a filtered request; and routing the filtered request, excluding the rewritten URL, to a specific servlet that is an appropriate servlet for servicing the subsequent request. In at least one embodiment, routing the filtered request to an appropriate servlet comprises identifying the appropriate servlet based on the unique ID stripped out of the subsequent request. The method further includes receiving a servlet response to the filtered request passed to the appropriate servlet; and in response to receiving the servlet response, matching the servlet response to the subsequent request and forwarding the servlet response to the client browser using the session cookie associated with the subsequent request.

According to another aspect of the present disclosure, an information handling system includes a system memory, a communication mechanism for communicating with clients, and a processor communicatively coupled to the system memory and communication mechanism. The information handling system is configured to receive, from a client browser, a first login request that is associated with a first tab of a client browser window. The information handling system is also configured to generate a first uniform resource locator and a first session cookie in response to the first login request and to transmit, to the client browser, the first session cookie. A path of the first session cookie includes the first uniform resource locator. The information handling system is further configured to receive, from the client browser, a second login request. The second login request is associated with a second tab of the client browser window. Finally, the information handling system is configured to (a) generate a second uniform resource locator that is different from the first uniform resource locator and a second session cookie, in response to the second login request and (b) transmit, to the client browser, the second session cookie in response to the second login request. A path of the second session cookie includes the second uniform resource locator.

A computer program product includes a computer readable storage device and computer readable program code stored on the computer readable storage device. The computer readable program code, when executed by a processor of an information handling system, causes the information handling system to receive, from a client browser, a first login request that is associated with a first tab of a client browser window. The code, when executed by the processor, further causes the information handling system to, in response to the first login request, (a) generate a first uniform resource locator and a first session cookie that includes the first uniform resource locator a path of the cookie and (b) transmit, to the client browser, the first session cookie. The code, when executed by the processor, also causes the information handling system to receive, from the client browser, a second login request that is associated with a second tab of the client browser window. Finally, the code, when executed by the processor, causes the information handling system to, in response to the second login request, (a) generate a second uniform resource locator that is different from the first uniform resource locator and a second session cookie and (b) transmit, to the client browser, the second session cookie. A path of the second session cookie includes the second uniform resource locator.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 is a flow chart illustrating an example process executed by a web server for creating different sessions for each tab of a client browser window, according to another embodiment of the present disclosure.

DETAILED DESCRIPTION

Figure 1:
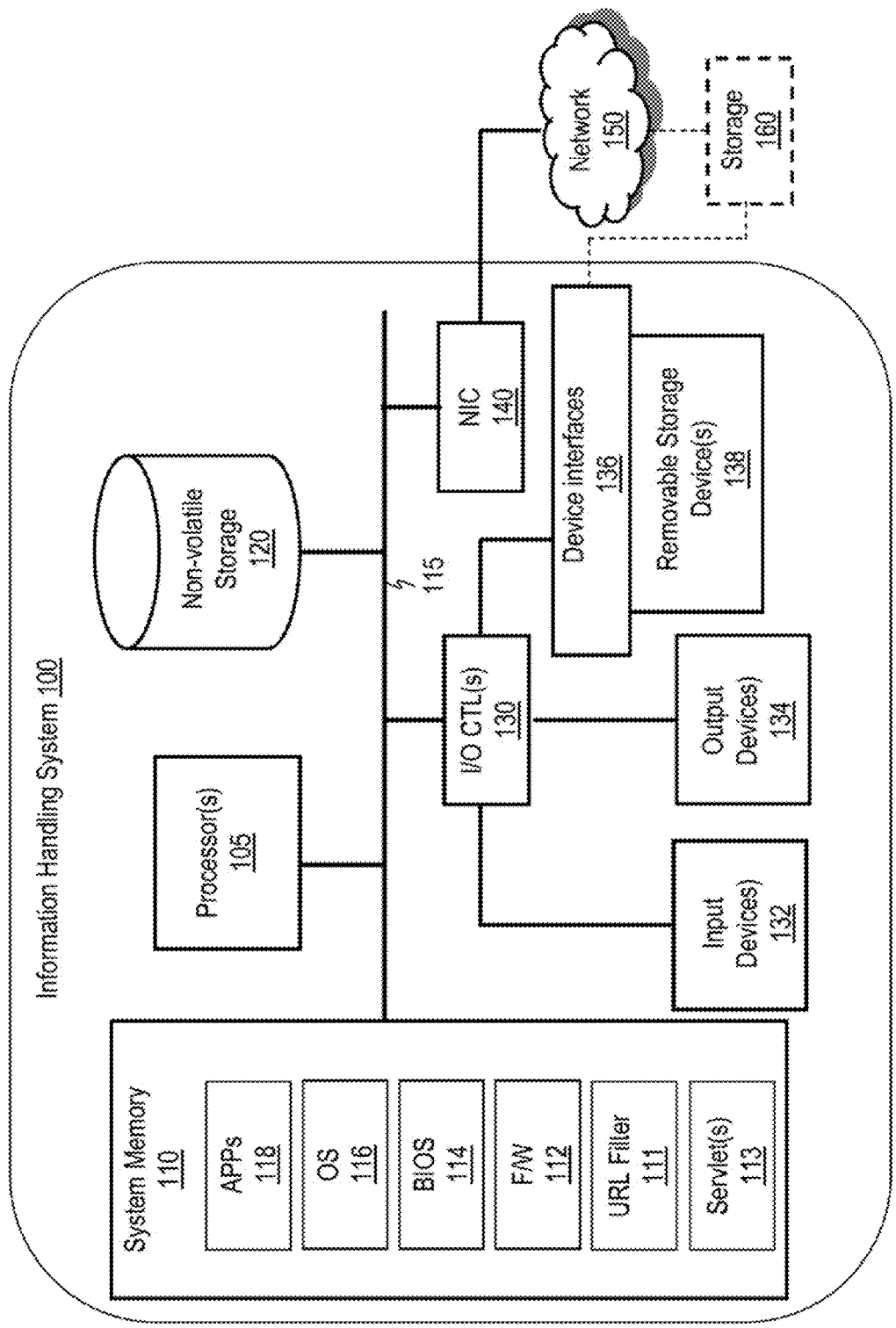
FIG. 1 provides a block diagram representation of an example information handling system within which certain aspects of the disclosure can be practiced, according to one embodiment.

The illustrative embodiments provide a method, an information handling system, and a computer program product for creating different sessions for each tab of a client browser window.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware components and basic configuration depicted in the following figures may vary. For example, the illustrative components within information handling system 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system and input/output (I/O) devices for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, a personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. As used herein the term 'client' is synonymous with a 'client computer system' or a 'client information handling system'. As is also used herein the term 'server' is synonymous with a 'server computer system' or a 'server information handling system'.

As mentioned above, session cookies are used to maintain session information for a browser. Session cookies store session identifiers (IDs) that are generated by a web server and sent back to a browser in response to a request. When the browser sends a session ID back to a web server with a next request, the web server correlates the request to the active session using the ID. By default, all browsers share session state between multiple tabs of a same browser window. In this case, when a user logs into a particular website using a first tab and then opens an internal link of the same website in a new second tab, the user is not required to log in to the website again. For example, assume a user opens Google™ using a client browser and logs into google.com. When the user opens a new tab in the same browser and enters gmail.com, the user will be automatically logged in and redirected to Google™ mail without being required to enter a user login again. Unfortunately, sharing a session state between multiple tabs of a browser may result in unintended consequences.

For example, assume an administrator of customer accounts for a website opens a browser window and opens a first tab to access an account of customer 'A' and then opens a new second tab in the same browser window to access an account of customer 'P'. A session cookie now holds information for customer 'P' and it is assumed that the administrator is editing the account of customer 'P'. Assume that after working on the account for customer 'P', the administrator selects the tab for customer 'A' and begins working on the account for the customer 'A'. In this case, the session information still indicates that the account for customer 'P' is being edited, which can result in data corruption for customer 'P'.

OpenManage Server Administrator™ (OMSA) provides a distributed web server management functionality that allows users to deploy OMSA on a single management station (e.g., a web server) and use the OMSA management station to remotely manage different server nodes. Typically users connect to the management station using a client browser and use multiple tabs in the browser to individually manage the different server nodes, i.e., one tab per managed sever node. In general, this approach is employed to avoid cluttering a desktop with multiple browser windows, i.e., one browser window per node being managed. A problem with using multiple tabs of a single browser window to individually manage different server nodes is that all modern browsers share session information between different tabs of the same browser window. The fact that session information is shared between different tabs of a same browser window makes it difficult to provide distributed web server management functionality through different tabs of the same browser and manage multiple server nodes through a common management station. An existing solution to the session sharing problem for OMSA is tightly coupled with Integrated Web Server™ (IWS) and cannot be generically used with web servers, e.g., Tomcat™, and Jetty™, offered by other organizations. As IWS code and OMSA code are maintained by the same organization (i.e., Dell Inc.), OMSA is configured to employ a special session name or ID which makes it possible to create a session ID for every new tab. According to aspects of the present disclosure, techniques are disclosed herein that advantageously provide a more generic solution for addressing the session sharing problem (when multiple tabs are employed in a single browser window) that may be broadly implemented on web servers provided by a wide variety of organizations.

According to various aspects of the present disclosure, URL rewriting is employed to facilitate the generation of different sessions cookies for each tab of a same browser window. According to one aspect of the present disclosure, a servlet on the server-side is employed to rewrite URLs to introduce a modified ID that is sent back to a browser. For example, a normal https://localhost:1311/login.html may be rewritten for a first browser window tab as https://localhost:1311/ABCD1234/login.html. The web server then returns a session cookie that has a cookie path of https://localhost:1311/1ABCD1234/ to the browser for the first browser window tab. The unique ID, provided by the session cookie, is then utilized by the browser when requesting resources for the first browser window tab (i.e., the browser utilizes the rewritten URL when generating additional requests for the first browser window tab). On the server-side, a URL filter is employed to strip out the rewritten URL and pass an appropriate URL onto an appropriate servlet. In this manner, a unique session ID is provided through a session cookie that is unique to a browser window tab.

When login is attempted from a different tab of the same browser window, as there is no session for the different tab (since the login is for a non-rewritten URL), a login servlet generates and introduces a new URL that has a different modified ID and returns a session cookie with a cookie path of the new URL to the browser. In this case, the browser is communicating using different URLs on the same web server and, as such, passes different session IDs for the different tabs of the same browser window to the web server. According to various aspects of the present disclosure, the server-side URL filter strips out the ID from the URL and, based on the ID, determines where the request is to be forwarded.

With reference now to the figures, and beginning with FIG. 1, there is depicted a block diagram representation of an example information handling system (IHS) 100, within which one or more of the described features of the various embodiments of the disclosure can be implemented. IHS 100 includes at least one central processing unit (CPU) or processor 105 coupled to a system memory 110 via a system interconnect 115. System interconnect 115 can be interchangeably referred to as a system bus, in one or more embodiments. Also coupled to system interconnect 115 is non-volatile storage (e.g., a non-volatile random access memory (NVRAM)) 120, within which can be stored one or more software and/or firmware modules and one or more sets of data that can be utilized during operations of IHS 100. These one or more software and/or firmware modules can be loaded into system memory 110 during operation of IHS 100. Specifically, in one embodiment, system memory 110 can include therein a plurality of such modules, including one or more of firmware (F/W) 112, basic input/output system (BIOS) 114, operating system (OS) 116, application(s) 118, URL filter 111, and servlet(s) 113. These software and/or firmware modules have varying functionality when their corresponding program code is executed by CPU 105 or secondary processing devices within IHS 100. For example, application(s) 118 may include a word processing application, a presentation application, a management station application, and a web browser (browser) application, among other applications. In one or more embodiments, servlet(s) 113 include a login servlet and a management station servlet that communicate with a management station application (not separately shown in FIG. 1), e.g., OMSA code.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit (I²C), system management bus (SMB), and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100. These devices, services, and components can interface with IHS 100 via an external network, such as example network 150, using one or more communication protocols. According to one aspect of the disclosure, NIC 140 represents a communication mechanism that enables the IHS to communicate with one or more clients, as described in greater detail hereinafter. Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it should be appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of physical disks or other storage media. In an alternate embodiment, and as represented by the second set of dashed interconnecting lines, data storage facility 160 can be directly connected, via device interface(s) 136, to IHS 100 as an external storage device.

Figure 2:
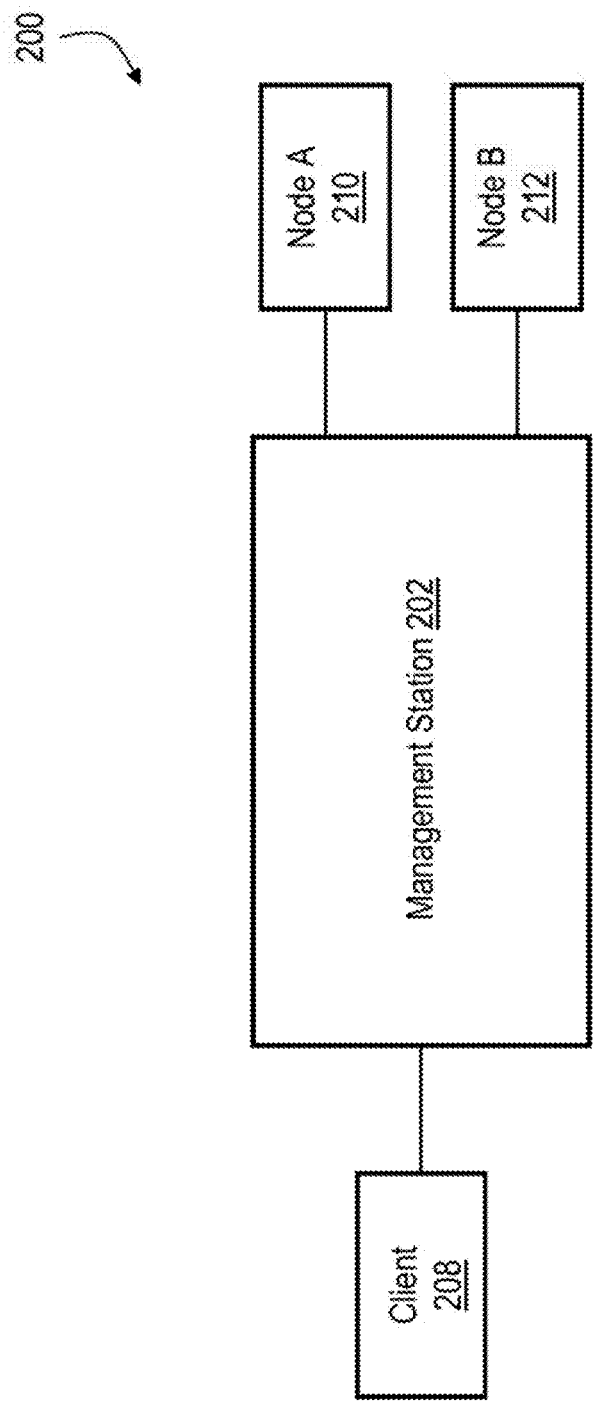
FIG. 2 illustrates an example computer network that is configured to allow a client, using multiple tabs of a same browser window, to control server nodes via a management station, in accordance with one or more embodiments of the present disclosure.

With reference to FIG. 2, an example organizational network 200 is illustrated that includes a management station 202 that is in communication with a client 208 and multiple server nodes 210 and 212. In a least one embodiment, management station 202 executes management station code to provide a distributed web server management functionality that allows users to remotely manage different server nodes via clients. For example, management station 202 may execute OMSA code to facilitate remote management of server nodes 210 and 212 using multiple tabs (one for each server node) of a browser window of client 208. Management station 202, client 208, and server nodes 210 and 212 may take the form of information handling system 100. While only a single client and two server nodes are shown in FIG. 2, it should be appreciated that an organizational network configured according to the present disclosure may include more than one client and more than two managed server nodes.

Figure 3:
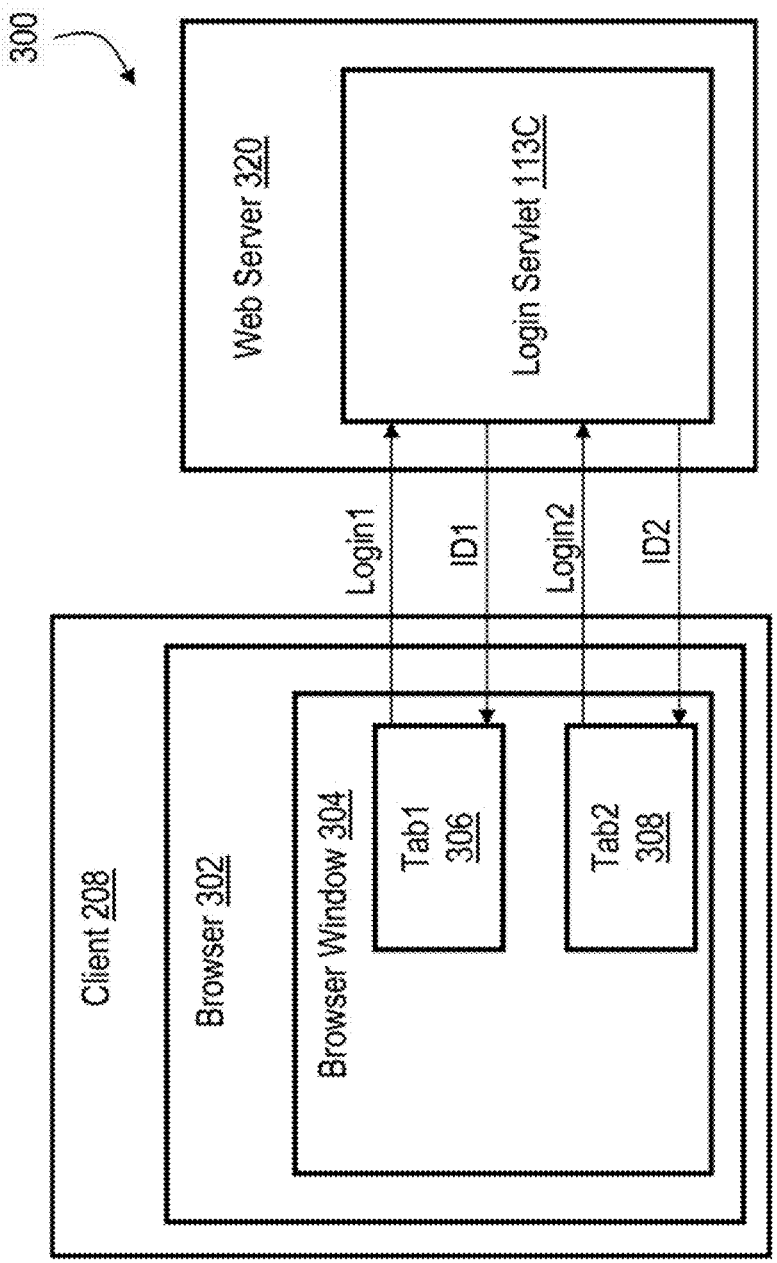
FIG. 3 is an example diagram illustrating multiple tabs of a same browser window receiving different uniform resource locators, according to one or more aspects of the present disclosure.

With reference to FIG. 3, communication flow diagram 300 illustrates a communication flow between a browser 302 (executing on client 208) and a login servlet 113C (executing on a web server 320). Web server 320 can be an information handling system, such as information handling system 100, which provides several or all of the server-side functionality associated with management station 202, as described herein. As is illustrated, a browser window 304 (of browser 302) includes multiple open tabs (labeled 'Tab1' and 'Tab2') 306 and 308 that are assigned different IDs (labeled 'ID1' and 'ID2', respectively) by login servlet 113C in response to login requests (labeled 'Login1' and 'Login2', respectively) from browser 302 that are generated in response to a user opening tabs 306 and 308. According to various aspects of the present disclosure, login servlet 113C rewrites URLs to introduce modified unique IDs that are sent back (within a generated session cookie) to browser 302 for each open tab.

For example, web server 320 returns a session cookie that has a cookie path with a unique ID (that corresponds to the rewritten URL) to browser 302 for first tab 306. The unique ID, provided by the session cookie, is then utilized by browser 302 when requesting resources for first tab 306 (i.e., browser 302 utilizes the rewritten URL when generating subsequent requests for first tab 306). When login is attempted from second tab 308 of browser window 304, as there is no session for second tab 308 (since 'Login2' is for a non-rewritten URL), login servlet 113C generates and introduces a new URL that has a different modified unique ID (i.e., 'ID2') and returns a session cookie with a cookie path of the new URL to browser 302. In this manner, browser 302 communicates with web server 320 using different URLs, i.e., browser 302 passes different session IDs for tabs 306 and 308 of browser window 304 to web server 320. On the server-side, a URL filter is employed to strip out rewritten URLs and pass an appropriate URL onto an appropriate servlet 113C. Using the disclosed technique, a unique session ID is provided through a session cookie that is unique to a browser window tab.

Figure 4:
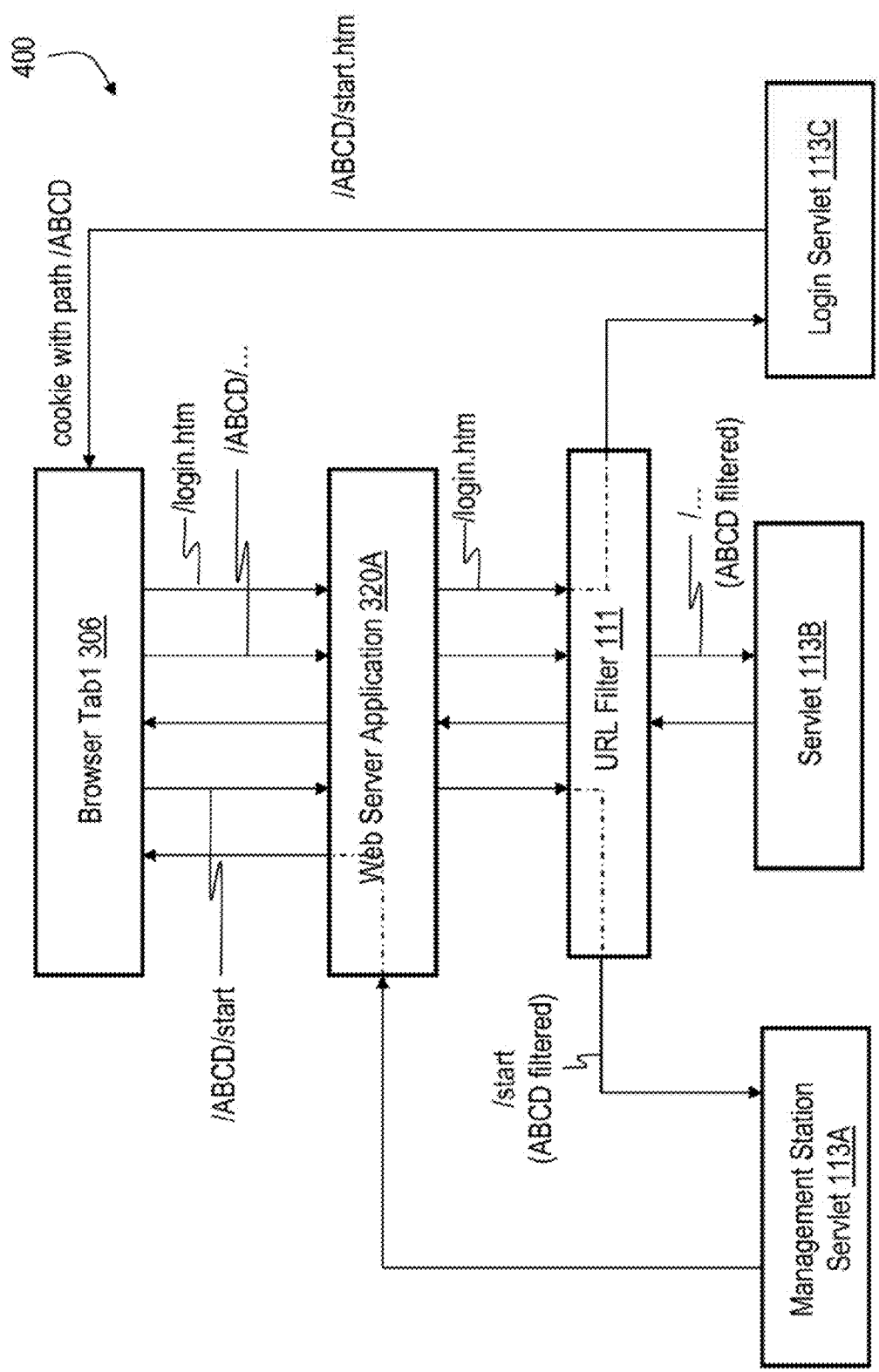
FIG. 4 is an example request flow diagram for communication between a first tab of a browser window and a web server, according to one embodiment of the present disclosure.

With reference to FIG. 4, a request flow diagram 400 is depicted that further illustrates communication between first tab (labeled 'Browser Tab1') 306 (of browser window 304 of browser 302) and web server application 320A executing on web server 320, according to an embodiment of the present disclosure. As is depicted, a login request '/login.htm' generated by browser 302 (for first tab 306) is communicated to web server application 320A, which communicates the login request to URL filter 111. URL filter 111 routes the login request to login servlet 113C, which generates a response '/ABCD/start.htm' and a session cookie with a path '/ABCD' that corresponds to a rewritten URL.

As is shown, subsequent requests generated by browser 302 (for first tab 306) include the rewritten URL path '/ABCD/'. The subsequent requests are received by web server application 320A, which routes the requests to URL filter 111. URL filter 111 filters the rewritten URL (i.e., strips the '/ABCD/' portion of the rewritten URL) and routes the requests to an appropriate servlet for servicing. The requests may, for example, be routed to servlet 113B or management station servlet 113A, based on the rewritten URL. A request that includes the term '/ABCD/start' is filtered (by URL filter 111) and routed as '/start' to management station servlet 113A, which generates a response and forwards the response to web server application 320A. For example, the response by management station servlet 113A may include content for providing a management station welcome page to first tab 306 of browser window 304 (FIG. 3). Similarly, a request that includes the term '/ABCD/ . . . ' is filtered (by URL filter 111) and routed as '/ . . . ' to servlet 113B, which generates a response and forwards the response to web server application 320A.

Figure 5:
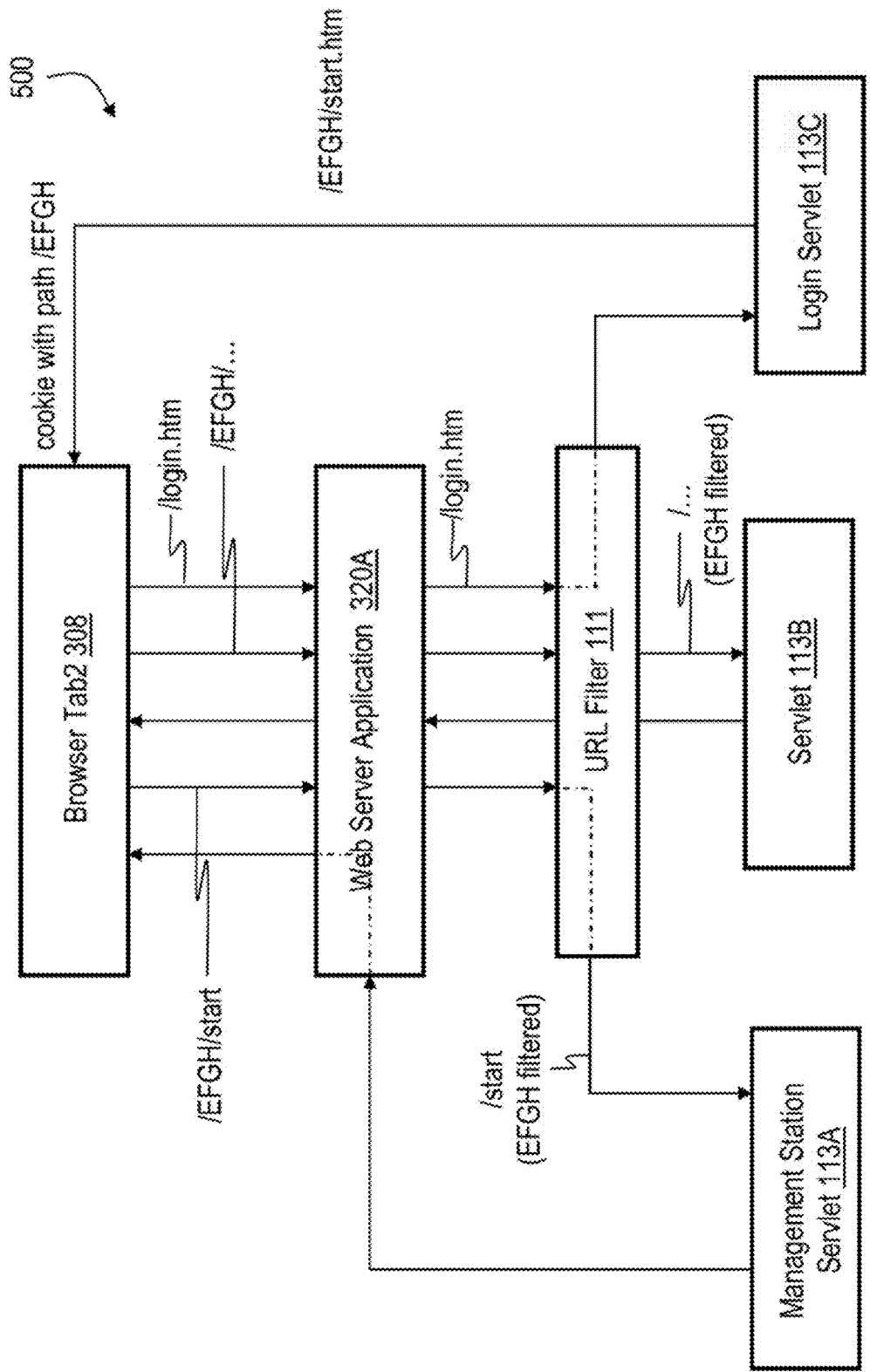
FIG. 5 is an example request flow diagram for communication between a second tab of the browser window and the web server, according to another embodiment of the present disclosure.

With reference to FIG. 5, a request flow diagram 500 is depicted that further illustrates communication between second tab (labeled 'Browser Tab2') 308 (of browser window 304 of browser 302) and web server application 320A, according to another embodiment of the present disclosure. As is depicted, a login request '/login.htm' generated by browser 302 (for second tab 308) is communicated to web server application 320A, which communicates the login request to URL filter 111. URL filter 111 routes the login request to login servlet 113C, which generates a response '/EFGH/start.htm' and a session cookie with a path '/EFGH' that corresponds to a rewritten URL.

As is shown, subsequent requests generated by browser 302 (for second tab 308) include the rewritten URL path '/EFGH/'. The subsequent requests are received by web server application 320A, which routes the requests to URL filter 111. URL filter 111 filters the rewritten URL (i.e., strips the '/EFGH' portion of the rewritten URL) and routes the requests to an appropriate servlet for servicing. The requests may, for example, be routed to servlet 113B or management station servlet 113A, based on the rewritten URL. A request that includes the term '/EFGH/start' is filtered (by URL filter 111) and routed as '/start' to management station servlet 113A, which generates a response and forwards the response to web server application 320. For example, the response by management station servlet 113A may include content for providing a management station welcome page to second tab 308 of browser window 304 (see FIG. 3). Similarly, a request that includes the term '/EFGH/ . . . ' is filtered (by URL filter 111) and routed as '/ . . . ' to servlet 113B, which generates a response and forwards the response to web server application 320A. It should be appreciated that through application of URL rewriting by login servlet 113C, different session IDs are generated for first and second tabs 306 and 308 of browser window 304.

Figure 6:
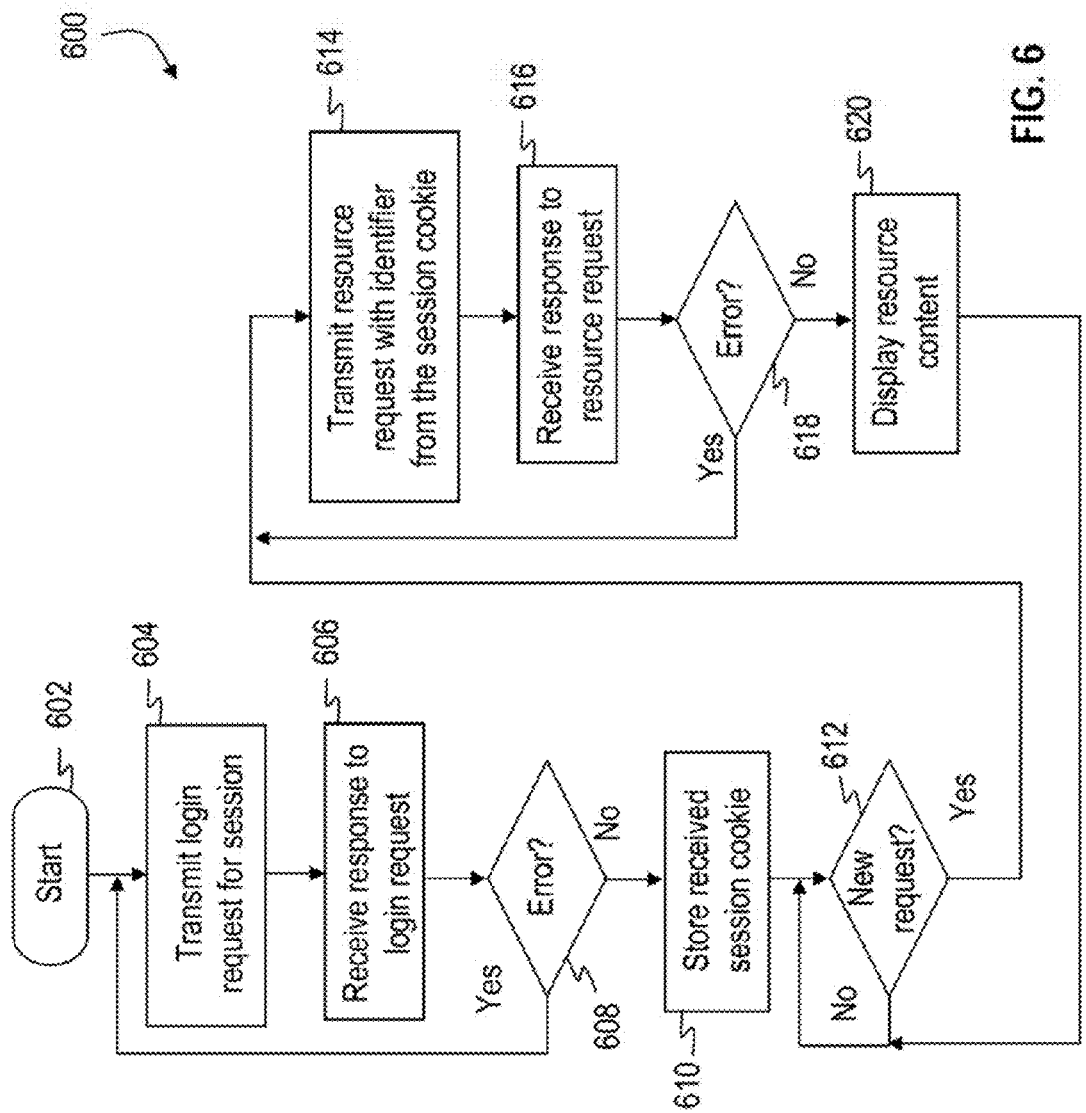
FIG. 6 is a flow chart illustrating an example process executed by a browser (user agent) of a client, according to one embodiment of the present disclosure.

With reference to FIG. 6, a process 600 is illustrated that may be executed by browser 302 executing on client 208, when generating a request to web server 320. At start block 602 process 600 is initiated in response to, for example, a user entering a specific URL into browser 302 or opening an additional tab of a browser window. Next, in block 604, browser 302 transmits a login request for a session to a website designated by the specific URL. Then, in block 606, browser 302 receives a response to the login request. For example, the response may indicate an error or the response may include a unique ID (e.g., included in a session cookie) that corresponds to a rewritten URL. Next, in decision block 608, browser 302 determines whether an error indication was received in response to the login request. In response to an error being indicated in block 608, control transfers to block 604. In response an error not being indicated in block 608, control transfers to block 610 where browser 302 stores a received session cookie that includes the unique ID that corresponds to the rewritten URL.

Then, in decision block 612, browser 302 determines (e.g., based on input from a user) whether a new resource request should be generated to web server 320. In response to a new resource request not being indicated, control loops on block 612 while process 600 is active. In response to a new resource request being indicated, control transfers from block 612 to block 614, where browser 302 transmits a subsequent resource request to web server 320 with an ID from the session cookie. Next, in block 616, browser 302 receives a response from web server 320 that includes content of the resource. Then, in decision block 618, browser 302 determines whether an error indication was received in response to the resource request. In response to an error being indicated in block 618, control transfers to block 614. In response to no error being indicated in block 618, control transfers to block 620 where browser 302 displays the received resource content on a monitor of an associated client (e.g., client 208). For example, the received resource content may include performance data of a particular server node that is being managed. Following block 620, control transfers to block 612 while process 600 is active.

With reference to FIG. 7, a process 700 is illustrated that may be executed by web server 320 (i.e., via execution of web server application 320A). Process 700 may be, for example, initiated in start block 702 following generation of a request by browser 302 of client 208. In block 704 web server 320 receives a browser request from browser 302. Next, in decision block 706, web server 320 determines whether the request is associated with a rewritten URL. In response to the request being associated with a rewritten URL (i.e., the request is not an initial login request) control transfers from block 706 to block 714. In block 714, URL filter 111 strips the rewritten URL from the request and routes the request to an appropriate servlet (e.g., servlets 111A or 111B) for response. Then, in block 716, the appropriate servlet generates a response to web server 320, which then transmits the response to browser 302. In response to the request not being associated with a rewritten URL (i.e., the request is a login request) control transfers from block 706 to block 708. In block 708, the request is routed to login servlet 111C. Next, in block 710, the login servlet 111C transmits a rewritten URL to browser 302 in the form of a session cookie. Following blocks 710 and 716 control transfers to end block 712 where process 700 terminates until a next request is initiated by browser 302.

Accordingly, techniques are disclosed herein that advantageously provide a generic solution for addressing the session sharing problem that may occur when multiple tabs are utilized in a single browser window. According to the present disclosure, each tab of a single browser window is assigned a unique identifier. Various embodiments provide a method, an information handling system and a computer program product that creates different sessions for each tab of a client browser window. The information handling system includes: a system memory; a communication mechanism that enables exchange of communication with one or more clients; and a processor communicatively coupled to the system memory and the communication mechanism. The processor executes program code which configures the information handling system to: receive, from a client browser, a first login request that is associated with a first tab of a client browser window; and in response to the first login request: generate a first uniform resource locator (URL) and a first session cookie. A path of the first session cookie includes the first uniform resource locator. The information handling system also transmits the first session cookie to the client browser. The processor also executes program code which configures the information handling system to: receive, by the information handling system, a second login request from the client browser that is associated with a second tab of the client browser window; and in response to the second login request: generate a second uniform resource locator (URL) and a second session cookie, and transmit the second session cookie to the client browser. The second URL is different from the first URL, and a path of the second session cookie includes the second URL.

According to one aspect of the disclosure, the processor-executed code that configures the information handling system to generate the first URL and to generate the second URL comprises a login servlet executing on the processor and which configures the information handling system to: rewrite a general URL to respectively generate the first URL and the second URL as rewritten URLs, each having a respective unique session ID that is included within the session cookie transmitted to the client browser. Accordingly, a different session cookie is generated for each tab of a same browser window, and each session cookie provides the unique session ID, corresponding to the rewritten URL, that can be utilized by the client browser when generating subsequent requests from a corresponding tab of the client browser window to the information handling system.

According to another aspect of the disclosure, the client browser is configured to transmit a first identifier that is associated with the first uniform resource locator to the information handling system for subsequent resource requests associated with the first tab and to transmit a second identifier that is associated with the second uniform resource locator to the information handling system for subsequent resource requests associated with the second tab. Also, the information handling system is further configured to: in response to receiving a subsequent request associated with one of the first tab and the second tab of the client browser: filter the subsequent request by stripping out the unique ID from the rewritten URL contained in the subsequent request to provide a filtered request; and route the filtered request, excluding the rewritten URL, to a specific servlet that is an appropriate servlet for servicing the subsequent request.

According to another aspect of the disclosure, the processor-executed code that configures the information handling system to route the filtered request to an appropriate servlet includes code that configures the processor to identify the appropriate servlet based on the unique ID stripped out of the subsequent request.

Further, according to one aspect, the processor-executed code further configures the information handling system to: receive a servlet response to the filtered request passed to the appropriate servlet; and in response to receiving the servlet response, match the servlet response to the subsequent request and forward the servlet response to the client browser using the session cookie associated with the subsequent request.

Also, in one embodiment, the information handling system includes a management station and multiple server nodes that collectively provides a distributed web server management functionality that enables remote management of different server nodes via a client using multiple tabs of a browser window of the client. Also, each tab of the browser window can be uniquely allocated to a corresponding server node utilizing the rewritten URL, wherein the first tab is associated with a first server node and the second tab is associated with a second server node that is different from the first server node.

In the above described flow charts, one or more of the method processes may be embodied in a computer readable device containing computer readable program code such that a series of steps are performed when the computer readable program code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, an electronic, magnetic, optical, electromagnetic, infrared, or semiconductor system, apparatus, or device, or any suitable combination of the foregoing. More specific examples (a non-exhaustive list) of the computer readable storage device include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that stores a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of creating different sessions for each tab of a client browser window, the method comprising:
   receiving, by an information handling system, a first login request from a client browser, wherein the first login request is associated with a first tab of a client browser window;
   in response to the first login request:
      generating a first uniform resource locator (URL) and a first session cookie, wherein a path of the first session cookie includes the first uniform resource locator; and
      transmitting the first session cookie to the client browser;
   receiving, by the information handling system, a second login request from the client browser, wherein the second login request is associated with a second tab of the client browser window;
   in response to the second login request:
      generating a second uniform resource locator (URL) and a second session cookie, wherein the second URL is different from the first URL and a path of the second session cookie includes the second URL; and
      transmitting the second session cookie to the client browser;
   wherein the information handling system includes a management station and multiple server nodes that collectively provides a distributed web server management functionality that enables remote management of different server nodes via a client using multiple tabs of a browser window of the client, wherein a management station provides a response including content for providing a management station welcome page to the first tab and second tab of the browser window, wherein each tab of the browser window can be uniquely allocated to a corresponding server node utilizing the rewritten URL, and wherein the first tab is associated with a first server node and the second tab is associated with a second server node that is different from the first server node.

2. The method of claim 1, wherein the generating of the first URL and the generating of the second URL comprises:

a login servlet of the information handling system rewriting a general URL to respectively generate the first URL and the second URL as rewritten URLs, each having a respective unique session ID that is included within the session cookie transmitted to the client browser;

wherein a different session cookie is generated for each tab of a same browser window, and each session cookie provides the unique session ID, corresponding to the rewritten URL, that can be utilized by the client browser when generating subsequent requests from a corresponding tab of the client browser window to the information handling system.

3. The method of claim 2, wherein:

the client browser is configured to transmit a first identifier that is associated with the first uniform resource locator to the information handling system for subsequent resource requests associated with the first tab and to transmit a second identifier that is associated with the second uniform resource locator to the information handling system for subsequent resource requests associated with the second tab; and the method further comprises:

in response to receiving a subsequent request associated with one of the first tab and the second tab of the client browser:

filtering the subsequent request by stripping out the unique ID from the rewritten URL contained in the subsequent request to provide a filtered request; and routing the filtered request, excluding the rewritten URL, to a specific servlet that is an appropriate servlet for servicing the subsequent request.

4. The method of claim 3, wherein routing the filtered request to an appropriate servlet comprises identifying the appropriate servlet based on the unique ID stripped out of the subsequent request.

5. The method of claim 3, further comprising:

receiving a servlet response to the filtered request passed to the appropriate servlet; and in response to receiving the servlet response, matching the servlet response to the subsequent request and forwarding the servlet response to the client browser using the session cookie associated with the subsequent request.

6. An information handling system, comprising:

a system memory;

a communication mechanism that enables exchange of communication with one or more clients;

a processor communicatively coupled to the system memory the communication mechanism and which executes program code that configures the information handling system to:

receive, from a client browser, a first login request, wherein the first login request is associated with a first tab of a client browser window;

in response to the first login request:

generate a first uniform resource locator (URL) and a first session cookie, wherein a path of the first session cookie includes the first uniform resource locator; and transmit the first session cookie to the client browser;

receive, by the information handling system, a second login request from the client browser, wherein the second login request is associated with a second tab of the client browser window;

in response to the second login request:

generate a second uniform resource locator (URL) and a second session cookie, wherein the second URL is different from the first URL and a path of the second session cookie includes the second URL; and transmit the second session cookie to the client browser;

a management station and multiple server nodes that collectively provides a distributed web server management functionality that enables remote management of different server nodes via a client using multiple tabs of a browser window of the client, wherein a management station provides a response including content for providing a management station welcome page to the first tab and second tab of the browser window;

wherein each tab of the browser window can be uniquely allocated to a corresponding server node utilizing the rewritten URL, and wherein the first tab is associated with a first server node and the second tab is associated with a second server node that is different from the first server node.

7. The information handling system of claim 6, wherein the processor-executed code that configures the information handling system to generate the first URL and to generate the second URL comprises a login servlet executing on the processor and which configures the information handling system to:

rewrite a general URL to respectively generate the first URL and the second URL as rewritten URLs, each having a respective unique session ID that is included within the session cookie transmitted to the client browser;

wherein a different session cookie is generated for each tab of a same browser window, and each session cookie provides the unique session ID, corresponding to the rewritten URL, that can be utilized by the client browser when generating subsequent requests from a corresponding tab of the client browser window to the information handling system.

8. The information handling system of claim 7, wherein:

the client browser is configured to transmit a first identifier that is associated with the first uniform resource locator to the information handling system for subsequent resource requests associated with the first tab and to transmit a second identifier that is associated with the second uniform resource locator to the information handling system for subsequent resource requests associated with the second tab; and the information handling system is further configured to:

in response to receiving a subsequent request associated with one of the first tab and the second tab of the client browser:

filter the subsequent request by stripping out the unique ID from the rewritten URL contained in the subsequent request to provide a filtered request; and route the filtered request, excluding the rewritten URL, to a specific servlet that is an appropriate servlet for servicing the subsequent request.

9. The information handling system of claim 8, wherein the processor-executed code that configures the information handling system to route the filtered request to an appropriate servlet includes code that configures the processor to identify the appropriate servlet based on the unique ID stripped out of the subsequent request.

10. The information handling system of claim 8, wherein the processor-executed code further configures the information handling system to:

receive a servlet response to the filtered request passed to the appropriate servlet; and in response to receiving the servlet response, match the servlet response to the subsequent request and forward the servlet response to the client browser using the session cookie associated with the subsequent request.

11. A computer program product, comprising:
a computer readable storage device; and
computer readable program code stored on the computer readable storage device, wherein the computer readable program code, when executed by a processor of an information handling system, causes the information handling system to:
receive, from a client browser, a first login request, wherein the first login request is associated with a first tab of a client browser window;
in response to the first login request:
generate a first uniform resource locator (URL) and a first session cookie, wherein a path of the first session cookie includes the first uniform resource locator; and
transmit the first session cookie to the client browser;
receive, by the information handling system, a second login request from the client browser, wherein the second login request is associated with a second tab of the client browser window;
in response to the second login request:
generate a second uniform resource locator (URL) and a second session cookie, wherein the second URL is different from the first URL and a path of the second session cookie includes the second URL; and
transmit the second session cookie to the client browser;
wherein the information handling system includes a management station and multiple server nodes that collectively provides a distributed web server management functionality that enables remote management of different server nodes via a client using multiple tabs of a browser window of the client, wherein a management station provides a response including content for providing a management station welcome page to the first tab and second tab of the browser window, wherein each tab of the browser window can be uniquely allocated to a corresponding server node utilizing the rewritten URL, and wherein the first tab is associated with a first server node and the second tab is associated with a second server node that is different from the first server node.

12. The computer program product of claim 11, wherein the computer readable program code that configures the information handling system to generate the first URL and to generate the second URL comprises a login servlet which configures the information handling system to:
rewrite a general URL to respectively generate the first URL and the second URL as rewritten URLs, each having a respective unique session ID that is included within the session cookie transmitted to the client browser;
wherein a different session cookie is generated for each tab of a same browser window, and each session cookie provides the unique session ID, corresponding to the rewritten URL, that can be utilized by the client browser when generating subsequent requests from a corresponding tab of the client browser window to the information handling system.

13. The computer program product of claim 12, wherein:
the client browser is configured to transmit a first identifier that is associated with the first uniform resource locator to the information handling system for subsequent resource requests associated with the first tab and to transmit a second identifier that is associated with the second uniform resource locator to the information handling system for subsequent resource requests associated with the second tab; and
the computer readable program code comprises code that configures the information handling system to:
in response to receiving a subsequent request associated with one of the first tab and the second tab of the client browser:
filter the subsequent request by stripping out the unique ID from the rewritten URL contained in the subsequent request to provide a filtered request; and
route the filtered request, excluding the rewritten URL, to a specific servlet that is an appropriate servlet for servicing the subsequent request.

14. The computer program product of claim 13, wherein the computer readable program code that configures the information handling system to route the filtered request to an appropriate servlet includes code that configures the processor to identify the appropriate servlet based on the unique ID stripped out of the subsequent request.

15. The computer program product of claim 13, wherein the computer readable program code further comprises code that configures the information handling system to:
receive a servlet response to the filtered request passed to the appropriate servlet; and
in response to receiving the servlet response, match the servlet response to the subsequent request and forward the servlet response to the client browser using the session cookie associated with the subsequent request.

* * * * *